United States Patent [19]
Kashyap

[11] Patent Number: 4,767,210
[45] Date of Patent: Aug. 30, 1988

[54] OPTICAL FIBRE INTERFEROMETER

[75] Inventor: Raman Kashyap, Ipswich, England

[73] Assignee: British Telecommunications plc, Great Britain

[21] Appl. No.: 23,906

[22] Filed: Mar. 10, 1987

Related U.S. Application Data

[63] Continuation of Ser. No. 583,316, Feb. 24, 1984, abandoned.

[30] Foreign Application Priority Data

Feb. 24, 1983 [GB] United Kingdom ............... 8305154
Mar. 11, 1983 [GB] United Kingdom ............... 8306773
Mar. 11, 1983 [GB] United Kingdom ............... 0306774

[51] Int. Cl.⁴ .......................................... G01B 9/02
[52] U.S. Cl. ................................. 356/345; 250/227
[58] Field of Search .............. 356/345, 358; 250/227

[56] References Cited

U.S. PATENT DOCUMENTS

| | | |
|---|---|---|
| 4,322,829 | 3/1982 | Davis et al. |
| 4,420,260 | 12/1983 | Martinelli ...................... 356/358 X |
| 4,482,248 | 11/1984 | Paupuchon et al. ............ 356/352 X |
| 4,533,247 | 8/1985 | Epworth ........................... 356/345 |

FOREIGN PATENT DOCUMENTS

| | | |
|---|---|---|
| 3031961 | 3/1982 | Fed. Rep. of Germany ...... 356/358 |
| WO82/04311 | 12/1982 | PCT Int'l Appl. |

OTHER PUBLICATIONS

"Fibre Optic Sensors" by T. G. Giallorenzi, Optics and Laser Technology, Apr. 1981, pp. 73–78.
"Short Communication" by F. Parmigiani, Optical and Quantum Electronics, vol. 10, 1978, pp. 533–535.
"High Noise Rejection Fibre-Optic Probe for Interferometric Applications", M. Martinelli, Optics Letters, vol. 7, (1982), Apn. Nott, New York.
Fiber-Optic Michelson Interferometer Using an Optical Power Divider, M. Imai et al., Optics Letters, vol. 5, (1980) Oct., No. 10.
Flexible Coherent Optical Probe for Vibration Measurements, S. Ueha et al., Optics Communications, vol. 23, No. 3, Dec. 1977, pp. 407–409.
Single Fibre Interferometric Accoustic Sensor, J. A. Bucaro et al., Applied Optics, vol. 17, No. 3, Feb. 1, 1978.
Monomode Polarization Maintaining Optical Fibre Directional Couplers, B. K. Nayer and D. R. Smith, Optics Letters, vol. 8, pp. 543–545, Oct. 1983.

Primary Examiner—Davis L. Willis
Assistant Examiner—Matthew W. Koren
Attorney, Agent, or Firm—Nixon & Vanderhye

[57] ABSTRACT

An optical fibre Michelson interferometer has mirrors of highly reflective coatings deposited on the ends of the fibres forming the free arms of the interferometer. The interferometer preferably comprises single mode fibres, and is operated by a frequency swept laser.

The interferometer has applications in the optical fibre interferometer sensing field.

9 Claims, 3 Drawing Sheets

OPTICAL FIBRE INTERFEROMETER

This is a continuation of application Ser. No. 583,316 filed Feb. 24, 1984, now abandoned.

This invention relates to interferometers employing optical fibres, and to sensing arrangements employing such interferometers.

Considerable interest has been shown in recent years in optical fibre interferometers in general, and in optical fibre interferometric sensing arrangements in particular, since fibre optic transducer devices can be readily implemented for a wide variety of applications. (See, for example, "Fibre Optic Sensors" by T. G. Giallorenzi, OPTICS AND LASER TECHNOLOGY, April 1981, pp. 73–78.) To name but a few examples, fibre optic transducers have been used to measure magnetic fields, temperature, pressure, vibration, rotation, etc. Moreover, optical fibres have many properties which make them highly attractive for many sensing applications, offering, for example, immunity to electromagnetic interference, low propagation loss, resistance to chemical attack, and small size.

Interferometers considered for use with optical fibre, and other sensing devices and arrangements have frequently been interferometers with a Mach-Zehnder or Michelson configuration (see for example T. G. Giallorenzi op.cit., U.S. Pat. No. 4,322,829 (Charles M. Davis and Thomas G. Giallorenzi); "High-noise rejection fibre-optic probe for interferometric applications", M. Martinelli, OPTICS LETTERS vol. 7 (1982) Apn., Nott, New York; "Fibre-optic Michelson interferometer using an optical power divider", M. Imai et al, Optics Letters Vo. 5 (1980) October, No. 10; and "A high sensitivity laser vibration meter using a fibre-optic probe ", F. Parmigiani, OPTICAL AND QUANTUM ELECTRONICS, Vo. 10, 1978 (Short Communication), pp. 533–535), but other interferometer configurations have also been discussed in the technical literature (see, for example, "Flexible coherent optical probe for vibration measurements", S. Ueha et al, OPTICS COMMUNICATIONS, vol. 23, No. 3, December 1977, pp. 407–409; PCT patent application WO-A-82/04311 (Gould Inc.); and "Single Fibre Interferometric accoustic sensor", J. A. Bucaro et al, APPLIED OPTICS, vol. 17, No. 3, Feb. 1, 1978.)

The present invention is concerned with Michelson interferometers, and with interferometers of similar configuration such as for example Twyman-Green interferometers, which will hereinafter be referred to generically as Michelson interferometers.

The present invention aims to provide an improved optical fibre Michelson interferometer, and optical sensing apparatus incorporating an improved optical fibre Michelson interferometer.

According to one aspect of the present invention, a Michelson interferometer comprises an optical fibre input path, an optical fibre return path, and two optical fibre arms coupled to the input and return path and having higher reflective coatings applied to their free ends.

According to another aspect of the present invention, an interferometric fibre optic sensing arrangement comprises a Michelson interferometer in which an optical fibre reference arm and an optical fibre sensing arm are coupled to a fibre input path by means of an optical coupler, and in which mirrors at the end of the reference arm and the sensing arm are provided by a highly reflective coating applied to the respective fibre ends.

Providing the mirrored ends of the reference and sensing arm by deposition of a highly reflective coating on the fibre ends rather than as discrete mirror surfaces attached to the fibre ends provides several advantages, among them greater ease of manufacture, decreased susceptibility to vibration damage, and self-protection of the mirror surfaces against tarnishing by virtue of the exclusion of air etc. from the mirror surfaces.

The highly reflective coating may comprise dielectric or metallic material, chosen to provide high reflectivity at the operating wavelength of the interferometer.

The optical fibres of the Michelson interferometer according to the invention are conveniently single mode optical fibres.

Preferably, the interferometer is operated by a coherent light source which is frequency swept in the quadrature region for maximum sensitivity linear response.

Light returned from the arms, i.e., in the sensing arrangement from the reference arm and the sensing arm, may be returned via the same fibre optic coupler either through the input fibre or through a separate return fibre or both.

Since both the input and, where applicable, the separate return path carry the combined light to or from both arms, any perturbation in the input or the return path applies to the combined light, that is, the light entering, or returning, from both arms, thereby reducing the possibility of spurious and unwanted interference as compared to, for example, Mach-Zehnder interferometers.

The present invention will now be described further by way of example and with reference to the accompanying drawings of which:

Figure 1:
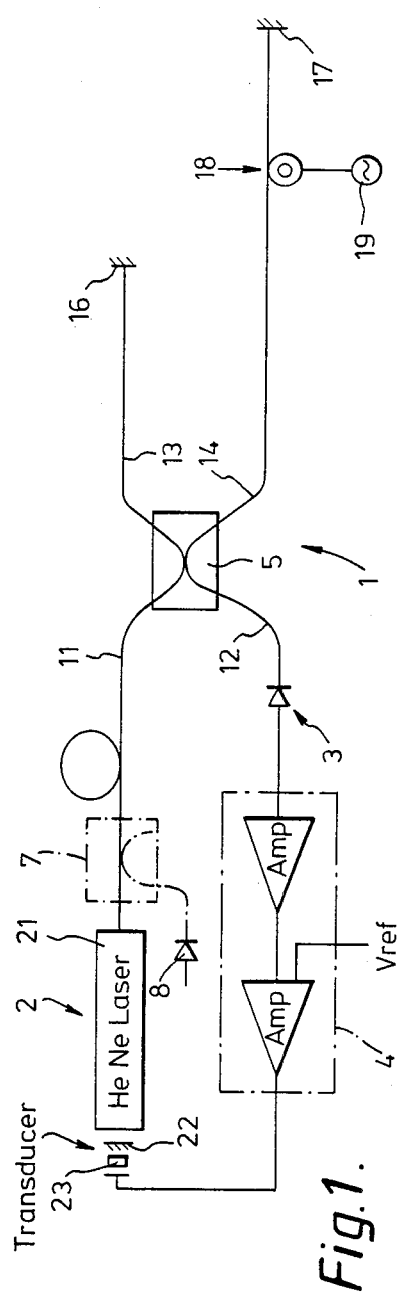
FIG. 1 is a schematic diagram of an optical fibre Michelson interferometric sensing apparatus.

Referring to FIG. 1, a fibre optic sensing apparatus comprises an optical fibre Michelson interferometer 1, a source of coherent light, a photodetector 3, and electronic signal processing circuitry 4.

The Michelson interferometer 1 comprises a directional optical waveguide coupler 5 providing a common node to optical fibres 11, 12, 13, and 14. Optical fibres 11 and 12 form, respectively, the transmit arm for the optical output to, and the receive arm for, optical output from the Michelson interferometer 1, while optical fibres 13 and 14 form respectively the reference arm and the sensing arm of the interferometer 1.

The coherent light source 2 comprises a HeNe gas laser 21 operating at a wavelength of nominally 1.52 $\mu$m in a single longitudinal mode. The rear mirror 22 of the HeNe laser 21 is mounted on a piezeoelectric transducer (PZT) 23 to permit tuning of the HeNe laser 21 by, in the present example, 1 MHz/V in the described arrangement. A semiconductor laser, for example, which is suitably tunable and operates in a single mode, may replace the HeNe gas laser.

The photodetector 3 is a germanium photodiode detector coupled to fibre 12, and has its electric output connected to electronic circuits 4.

The reference and sensing arms 11 and 12 of the Michelson interferometer have mirrors 16 and 17, respectively, deposited at the free ends by the following method.

The free ends of the optical fibres which are to form the reference and arm 13 the sensing arm 14 are cleaved at the desired position, and thoroughly cleaned. If required the cleaved ends may also be polished, as polishing provides closer end angle control and enables end angles close to zero to be obtained.

The fibre ends are given a final cleaning in distilled water, and are then immersed in a solution, at room temperature, of ammoniacal silver nitrate and sodium potassium tartrate.

The solution is gently warmed by about 50° C., to deposit silver on the fibre ends, at a rate sufficiently high for the process to be completed in about 5 minutes.

The solution is prepared as follows:

EXAMPLE

A first solution is prepared by adding the appropriate quantity of distilled water to 15 g of silver nitrate (AgNO$_3$) to obtain 150 ml of solution. About 50 ml of ammonium hydroxide (NH$_4$(OH)) solution 880 are added a drop at a time, stirring between drops until a brown precipitate is formed. Finally a few more drops of ammonium hydroxide are added until the precipitate redesolves.

A second solution is prepared by adding distilled water to 15 g of sodium potassium tartrate to make 200 ml of solution.

The first and second solution are finally combined in a ratio of 3 to 2 (e.g. 15 cc of the first solution to 10 cc of the second solution) and the solution is now ready for performing the above deposition. Great care should be exercised in preparing and handling the solution because of some danger of explosion.

Silver mirrors thus deposited have very closely matched reflectivities, the reflectivity of a protected silver mirror being theoretically about 98% at 1.52 $\mu$m. With similar reflectivities for both mirrors, an end angle error of approximately 0.2 degrees will result in a maximum differential power difference between the arms 13 and 14 of about 1% at 1.52 $\mu$m. Measurements of reflected power made on the deposited mirrors showed the reflectivity of the mirrors to be greater than 90%.

It will be appreciated that mirrors formed by deposition are to a large extent self-protecting since the reflecting surface is surrounded by silver, and the mirrors are less likely to be affected by formation of, for example, AgS which reduces reflectivity.

The directional coupler 5 was fabricated by a method described in, for example, "Monomode polarization maintaining optical fibre directional couplers", B. K. Nayer and D. R. Smith, OPTICS LETTERS, vol. 8, pp. 543–545, October 1983. The method described in that paper is briefly as follows: A fused silica block used for embedding the optical fibre is assembled by sandwiching a curved fused silica sliver between two thick fused silica blocks, the sense of curvature being such that the resulting groove is shallowest at the centre of the assembled block and deepest at the sides. The directional coupler 5 is then realised by placing one assembled block on top of the other with a thin film of an index matching liquid between the two. The coupling between the fibres in the two blocks can be varied by sliding one block relative to the other to give up to complete transfer of power into the unexcited arm. The couplers were, in this instance, fabricated using circular cored fibres having core diameters in the 8 $\mu$m to 10 $\mu$m range and with core-cladding refractive index differences in the range 0.003 to 0.006.

Referring now again to FIG. 1, the reference arm 13 and the sensing arm 14 are arranged to be of unequal length to provide an optical path difference between the two arms. The longer fibre forms the sensing arm, and the interference resulting from the optical path difference can now be observed either in the unexcited part of the coupler 5 connected to the receiver arm optical fibre 12, or on the transmit arm optical fibre 11 by providing a tapping with a further directional coupler 7 and a further photodetector 8 (see also FIG. 2) as show in dotted lines in FIG. 1.

Figure 4:
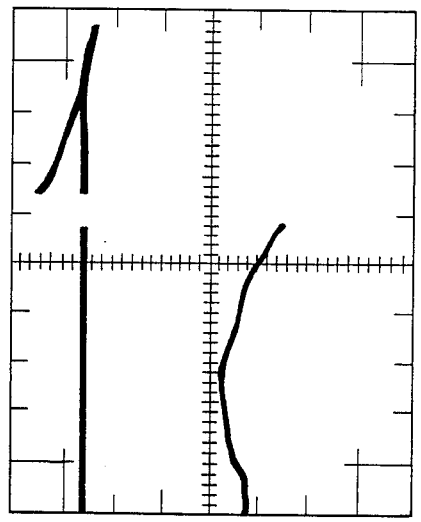

In order to eliminate random phase fluctuations between the sense and reference arms, 13, 14, a piezoelectric transducer 23 is mounted on the rear mirror of the laser 2 to change the cavity length and hence the frequency of the laser 2. A reference voltage $v_{ref}$ is generated and compared with the output of pnotodetector 3 to generate an error voltage which is amplified in electronic circuit 4 to drive the transducer 23. This allows the control of the phase setting at the photodiode to be in quadrature, for linear operation. It should be noted that the phase fluctuations on the transmit and receive arms do not have any effect on the measurement. Using this technique, phase locking to quadrature was achieved, as shown in FIG. 4. The upper trace shows the amplified phase locked photodiode output at 50 mV/cm (scan rate is 1s/cm), where a phase shift of $\pi$ radians is equivalent to 0.3 volts. The peak-to-peak noise was estimated to be less than $2.5*10^{-4}$ radians. The lower trace shows the control voltage on the transducer, where the total drift is of the order of $2\pi$ radians. A break in phase-locking can be seen on the trace. This was artificially induced to test for re-locking.

Figure 5:
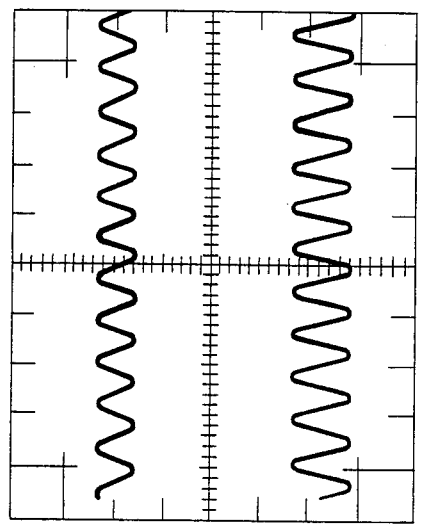
FIGS. 4 to 8 represent oscilloscope traces illustrating the operation of the sensing apparatus of FIGS. 1 to 3.

In order to measure a physical quantity, the sensing arm contains a transducer arranged to vary the transmission properties, and hence the optical path length. For the purpose of demonstrating the operation of the optical fibre sensing apparatus 1, a piezoelectric transducer 18, connected to a signal source 19 was included in the sensing arm 14. A signal of 125 KHz was applied to the piezo-electric transducer by the signal source 19. FIG. 5 shows the resulting output. The lower trace shows the modulation signal on the PZT, while the upper trace shows the received phase modulated output at the photo-diode 3.

Figure 2:
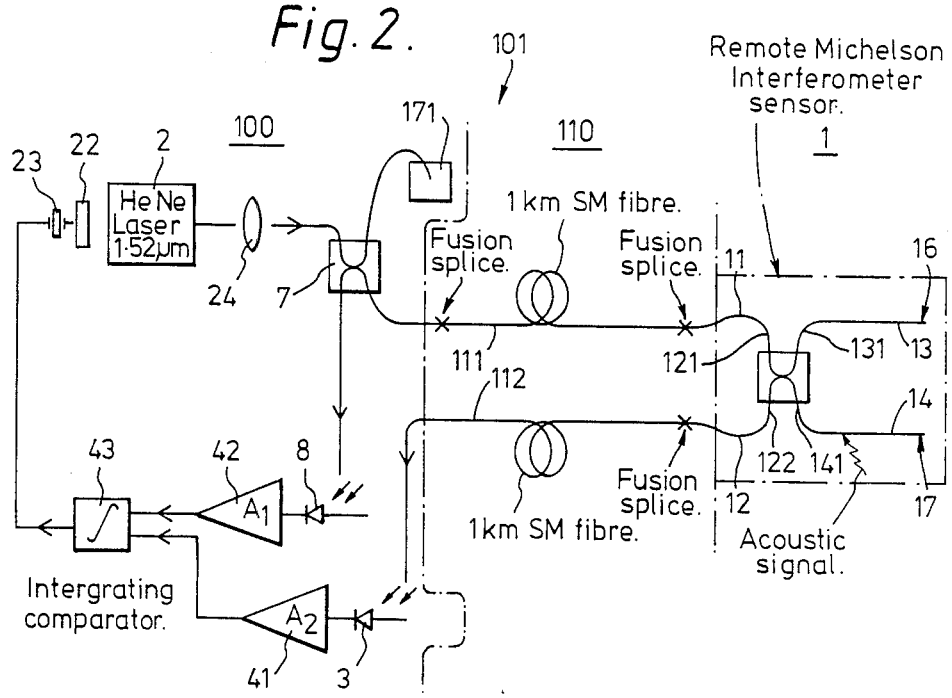
FIG. 2 is a schematic diagram of a modified optical fibre Michelson interferometric sensing apparatus.

A modified arrangment of the optical fibre interferometric sensing apparatus, which is suitable for remote sensing, is shown schematically in FIG. 2. This differs from the sensing apparatus of FIG. 1 by having two km single mode optical fibres 111 and 112 interposed between the Michelson interferometer 1 and the transmitter and receiver 100, and by having a modified transmitter and receiver 100.

Referring now to FIG. 2, an interferometric sensing arrangement 101 comprises an optical fibre Michelson interferometer 1, an optical fibre link 110 and a source and detector 100. As in FIG. 1, the optical fibre Michelson interferometer 1 consists of a single-mode fibre directional coupler 5 and arms 13 and 14, with mirrors 16 and 17 formed on the cleaved, free ends of both fibres 13 and 14. In the transmitter and receiver 100, composed of a HeNe laser light source 2 having its rear mirror 22 mounted on a PZT 23, and photodetectors 3 and 8, as well as amplifiers 41, 42 and 43, there is provided a further directional coupler 7, whose unused output arm terminates in a mode sink 171 which serves to reduce reflection of the laser output back into the laser or on to the photo-detector 8. The receiver receives the interference pattern returned from the Michelson interferometer 1 both from the transmit arm 11 and the receiver arm 12. The interference pattern of light returned by the reference arm is transmitted back to the transmitter and receiver 100, where it is directionally coupled into photodetector 8 by directional coupler 7, and the interference pattern present in the receiver arm 12 is transmitted via fibre 112 to photodetector 3.

Photodetectors 3 and 8 have their electrical output signals applied to the inputs of amplifiers 41 and 42 respectively. After amplification there the signals are applied to the input of an integrating comparator 43, which controls the PZT 23 and hence the operating frequency of the HeNe laser 2.

A brief analysis of the fibre interferometer 11 will aid in understanding the subsequently described operation of the remote sensing apparatus 101.

The fibre Michelson interferometer 1 can be analysed by determining the outputs at the directional coupler ports 121, 122 after the reflected signals from the reference arms 13 and the sense arm 14 are combined. The output field amplitudes of the fibre directional coupler 5 can be found using coupled mode theory and have been shown to be $$\begin{pmatrix} R \\ S \end{pmatrix} = \begin{pmatrix} \cos(cL) & -j\sin(cL) \\ -j\sin(cL) & \cos(cL) \end{pmatrix} \begin{pmatrix} A_i \\ B_i \end{pmatrix} \quad (1)$$

where $A_i$ and $B_i$ are the input field amplitudes at ports 121 and 122 of the coupler 5 respectively, and where R and S are the output field amplitudes at ports 131 and 141 of the coupler 5 respectively. c is the coupling coefficient and is assumed to be independent of the direction of propagation and the input port number. L is the coupler interaction length.

With only one optical input, in a Michelson interferometer, $B_i = 0$ and then outputs of the coupler 5 at ports 131 and 141 in absence of any coupler loss are given by $$R = A_i \cos(cL)$$

$$S = jA_i \sin(cL) \quad (2)$$

The output at ports 121 and 122 can be similarly evaluated using equation 1 and with input field amplitudes $A_o$ and $B_o$, at ports 131 and 141 respectively, after reflection from the mirrors 16, 17 at the fibre ends. These fields are given by $$A_o = R_r \rho_r \cos(cL) \exp j(\alpha + \pi)$$

$$B_o = jR_s \rho_s \sin(cL) \exp j(\beta + \pi) \quad (3)$$

$\pi_r$ and $\pi_s$ are the reflection coefficients for the reference and sense arms respectively. $\alpha$ and $\beta$ are the total phase changes in the reference and sense arms 3 and 4 respectively. $R_r$ and $R_s$ are the amplitude coefficients in the reference and sense arms 13 and 14 respectively. They differ from $A_i$ due to different losses and possible changes of the polarisation states in the two arms 13 and 14 of the interferometer.

Output optical powers $P_1$ and $P_2$, at ports 121 and 122 respectively, can then be found by taking a product of the complex field amplitudes at ports 121 and 122 with their respective complex conjugates and can be shown to be given by $$P_{121} = \tfrac{1}{4}[4\rho_r^2 R_r^2 \cos^4(cL) + 4\rho_s^2 R_s^2 \sin^4(cL) - 2\rho_r \rho_s R_r R_s \sin^2(2cL)\cos\delta]$$

$$P_{122} = \tfrac{1}{4}[\rho_r^2 R_r^2 + \rho_s^2 R_s^2 + 2\rho_r \rho_s R_r R_s \cos\delta]\sin^2(2cL) \quad (4)$$

$\delta = \alpha - \beta$ is the phase difference between the two arms.

For 3 dB couplers it can be shown from equation 2 that we have $cL = \pi/4$. Using deposition, the mirror reflection coefficients, $\rho_r$ and $\rho_s$, can be made nearly equal and for $\rho = \rho_r = \rho_s$ the above equations can be written in a simplified form as $$P_{121} = P/2[1 - T\cos\delta]$$
$$P_{122} = P/2[1 + T\cos\delta] \quad (5)$$

$P = \rho^2 R_r^2 (1 + \epsilon^2)/2$ and $R_r = R_s/\epsilon$. Also, power P is proportional to the input intensity $A_i^2$. The parameter $T = 2\epsilon/(1 + \epsilon^2)$ and is dependent on the differential power loss and polarisation effects in the reference and sense arms 13 and 14. In practice the differential power loss will be small, because of small path difference and low fibre loss, and T will be dependent primarily on the state of polarisation in the two arms 13 and 14.

It can be seen from equation (4) that in the case of $\rho_r = \rho_s$ and $R_r = R_s$ the fringe visibility in the output port 122 always approaches unity, irrespective of the splitting ratio of the coupler. For splitting ratios other than 3 dB it can be seen that the fringe visibility in port 121 is never unity. In the above analysis coupler losses have been ignored since they only affect the dynamic range.

In the interferometer configuration used, the reference arm 13 and the sense arm 14 are unbalanced and incorporate an optical path length difference $\Delta l$, giving a phase difference, $\delta = 2\pi \Delta l n_e \omega/c$, where $\omega$ is the optical frequency of the source, c is the speed of light in vacuum and $n_e$ is the effective refractive index of the mode in the optical fibre. Owing to environmental effects, such as changes in temperature and acoustic noise, there is random phase drift between the two arms giving rise to intensity fluctuations at the outputs. However, by varying the frequency $\omega$, the phase drift due to random variations can be cancelled. The error signal used to control the laser frequency can be derived from the difference in the signal powers $P_{121}$ and $P_{122}$ at ports 121 and 122 of the coupler 5 respectively. The condition for locking is thus $\cos\delta = 0$. This condition results in maximum sensitivity in quadrature with $\delta = 2m\pi + \pi/2$.

Turning now to the operation of the sensing arrangement 101, the interferometer 1 is unbalanced with a one way optical path difference of 2.36 m. With a total tunability of the laser of 365 MHz, this represents a total tracking range of approximately 36 radians. The single-mode directional coupler 7, inserted between the Michelson interferometer 1 and the laser 2, allows the signal from the interferometer 1 to be returned along the same fibre 111 and to be detected by the photodiode 8, on the input side of the coupler 7.

To demonstrate remote operation capability, a one kilometer length of single-mode fibre 111 was fusion spliced between one output port of the couper 7 and the interferometer 1. The other port of the coupler 7 is, as mentioned before, terminated at a mode sink 171. The return fibre 12 at port 121 of the interferometer 1 is also extended by one kilometer of single-mode fibre, 112, to a photodiode of photodetector 3. Signals from the photodiodes 3 and 8 are amplified by amplifiers 41 and 42 and fed to an integrating comparator, 43. The output of this comparator 43 closes the feedback loop to the piezo-electric transducer, PZT 23, on the rear mirror 22 of the laser 2.

The sense arm 14 of the interferometer was wrapped ten times round a PZT cylinder (see FIG. 1) and was used to simulate acoustic signals in the manner previously described.

The sensing arrangement is found to lock at some arbitrary point on the returned interferometric signals, depending on the reflectivities of the mirrors 16 and 17, the splitting ratios of the couplers 5 and 7, the loss in the fibres and the gain of the amplifiers 41 and 42. As has already been stated, the reflectivities of the two mirrors 6 and 7 can be closely matched. The two couplers 7 and 5 are set to give a 3-dB splitting ratio and the amplifier gains 41 and 42 adjusted to give the same signal level at the input of the comparator 43, in order to compensate for differential losses in the arms. This is easily achieved by modulating a PZT (not shown) provided on the reference arm to produce a phase change of $\pi$ radians and equalising the peak amplitudes at the output of the amplifiers. The interferometer is then locked in quadrature.

Figure 6:
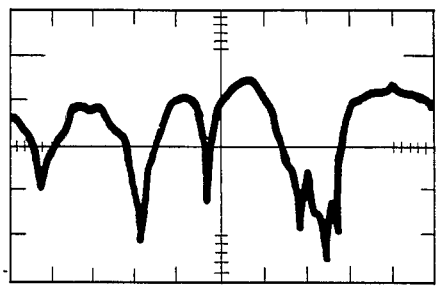

To demonstrate the locking capability of the interferometer, the PZT 23 on the rear mirror 22 of the laser 2 was modulated by a low level ac signal at 1 KHz. FIG. 6 shows an output of an electric spectrum analyser used as a narrow band detector, with the upper trace showing the effect of locking when the feedback loop is closed. The signal level remains constant over the measurement period (1 sec/div). From the measurement of noise in the interferometer, it was estimated that the minimum detectable signal level (SNR=1) within a 100 Hz bandwidth at 1 KHz was below $10^{-4}$ radians for the sensor operating at the end one kilometer of fibre. Occasionally, the interferometer would unlock as the total phase change induced by temperature fluctuations exceeded the available tracking range of the control loop of approximately 36 radians.

To show the effects of amplitude fluctuations due to random drifts, the feedback loop was broken. This is shown in the lower trace in FIG. 6. The total intensity excursions of the order of approximately 50 dB can be seen.

Figure 7:
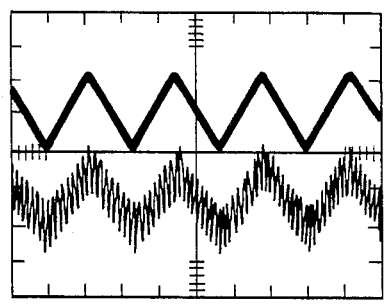
Figure 8:
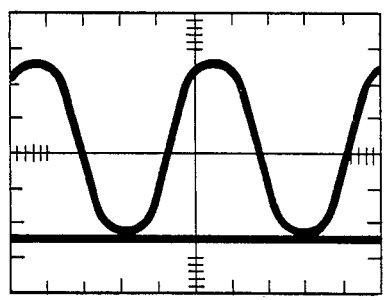

As in the case of the sensing apparatus of FIG. 1, the detection of an acoustic signal was simulated by modulating a PZT cylinder (not shown in FIG. 2) in the sense arm 14. With the interferometer locked in quadrature, a 1 KHz triangular wave modulation was applied to the PZT cylinder. A photograph of the output is shown in FIG. 7, where the lower trace shows the modulation signal on the PZT cylinder while the upper trace shows the received phase modulated output. To demonstrate near unity visibility, the PZT cylinder was overdriven with a 1 KHz ac modulation, A photograph of the output at port 122 is shown in FIG. 8, where the signal shows slight clipping to indicate the maximum and minimum of the interferogram. The optical input to the interferometer was then switched off. It can be seen in the photograph by coincidence of the minimum of the interferogram with the remaining dc level, that the fringe visibility is near unity. This was for an arbitrary setting of coupler 5 and holds true for all splitting ratios.

Quadrature locking using two detector photodiodes was described above with reference to FIG. 2. However, it is also possible to achieve quadrature locking of the modified Michelson interferometric sensing arrangement shown in FIG. 3, which differs from that of FIG. 2 mainly by using the same interferometer port 121 for both forward and return light transmission, and by using a detector circuit 244 to enable locking to any point of the interferogram. The detector circuit 244 essentially consists of a signal generator to apply periodic variations to the PZT 23, and hence modulate the laser frequency, and a comparator compares the output signal of the signal generator with the modulated return signal to derive a feedback signal which is summed with the signal generator output signal applied to the PZT 23.

Figure 3:
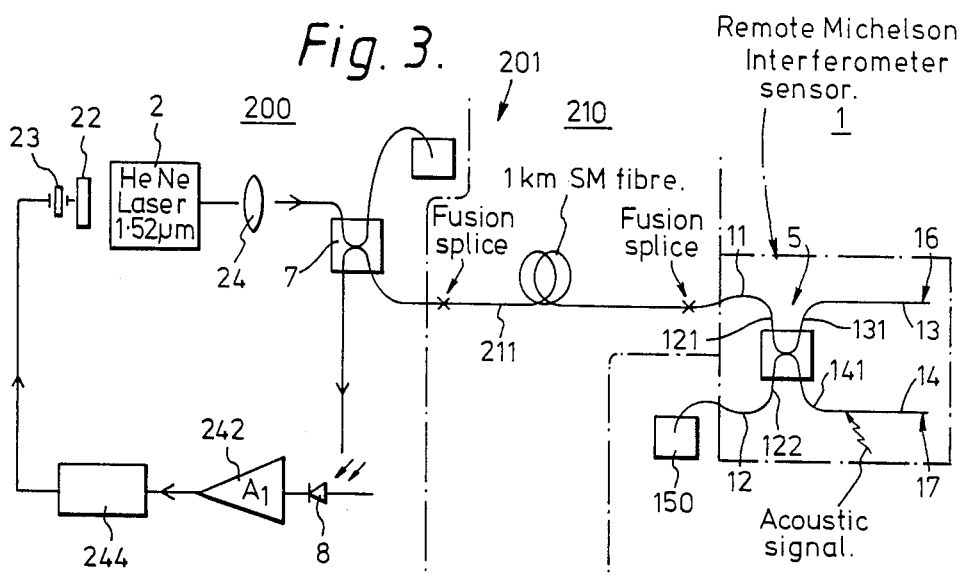
FIG. 3 is a schematic diagram of a further modified optical fibre Michelson interferometric sensing apparatus.

Although, as previously explained, using the port 1 for the return signal may, unless the power splitting ratio is exactly 3 dB, carry some penalty in fringe visibility, the advantage of the arrangement of FIG. 3 is that only a single fibre is required to connect the source and detector 200 to the interferometer 1.

It will be readily apparent to the skilled reader that the above described sensing arrangements may be modified by replacing the $H_eN_e$ laser with a semiconductor or other tunable laser of suitable linewidth.

Also, in the case where only three of the four ports of the fibre-optic X couplers are used the four-port couplers may be replaced by three-port or Y couplers.

Moreover, the skilled reader will readily appreciate that deposition methods other than from liquid solution, e.g. chemical vapour deposition, or sputtering, may be employed for the formation of the mirrors.

Applications of the present invention also include, for example, hydrophones where it may be desirable not to have any submersible power feed or electronics, allowing signal detection and processing to be carried out at the source end.

What I claim is:

1. An interferometric fibre optic sensing apparatus comprising a Michelson interferometer which comprises a single optical fibre input arm having a first end, and also having a second end adapted for coupling to a light source and to a light detecting means;

an optical fibre sense arm having a first end, and also having a second end provided with a highly reflective coating;

an optical fibre reference arm having a first end, and also having a second end provided with a highly reflective coating; and an optical fibre directional coupling means connected to and integral with said input arm first end, said sense arm first end, and said reference arm first end, for optically coupling said input arm, sense arm, and reference arm together, wherein the light reflected from said sense arm second end and from said reference arm second end is returned via said single input arm.

2. Apparatus as claimed in claim 1 in which the highly reflective coating comprises metallic material, chosen to provide high reflectivity at the operating wavelength of the interferometer.

3. Apparatus as claimed in claim 1 in which the highly reflective coating comprises dielectric material, chosen to provide high reflectivity at the operating wavelength of the interferometer.

4. Apparatus according to claim 1 which the optical fibres are single mode optical fibres.

5. Apparatus as claimed in claim 1, further comprising a coherent light source.

6. Apparatus as claimed in claim 5, further comprising means to sweep the coherent light source in the quadrature interference region.

7. Apparatus as claimed in claim 1 in which said mirrors deposited on said free fibre ends are deposited from a liquid solution.

8. A sensing apparatus as in claim 1 further comprising:
- an optical fibre transmit arm having a first end, and also having a second end adapted for coupling to said light source;
- an optical fibre receiver arm having a first end, and also having a second end adapted for coupling to said light detecting means; and
- a further optical fibre directional coupling means connected to and integral with said transmit arm first end, said receiver arm first end, and said input arm second end, for optically coupling said transmit arm, receiver arm, and input arm together, wherein light generated by the light source and transmitted via the transmit arm is input into the input arm, and light reflected from said sense arm and reference arm second ends and returned via the input arm is input into the receiver arm.

9. A Michelson-type optical fibre interferometer formed entirely by integrally connected and coupled optical fiber members optically coupled to a coherent light source and to a light detector via a single integrally connected optical fibre conduit, said interferometer comprising:
- an optical fibre directional coupler having three active optical fibre arms integral therewith, optically coupled together there-within and emanating therefrom including (a) a sense optical fibre arm having an integral reflective coating applied to a free end thereof, (b) a reference optical fibre arm having an integral reflective coating applied to a free end thereof, and (c) an input/output optical fibre arm, and
- an elongated optical fibre integrally connected with and optically coupled to said input/output optical fibre arm for coupling light signals to and from said directional coupler.

* * * * *